United States Patent

Pape

[11] Patent Number: 5,721,486
[45] Date of Patent: Feb. 24, 1998

[54] METHOD AND DEVICE FOR DETERMINING THE POSITION OF A ROTATING COGWHEEL

[75] Inventor: Peter Pape, Bergkamen, Germany

[73] Assignee: AB Elektronik GmbH, Werne, Germany

[21] Appl. No.: 513,778

[22] PCT Filed: Dec. 14, 1994

[86] PCT No.: PCT/EP94/04140

§ 371 Date: Sep. 29, 1995

§ 102(e) Date: Sep. 29, 1995

[87] PCT Pub. No.: WO95/16896

PCT Pub. Date: Jun. 22, 1995

[30] Foreign Application Priority Data

Dec. 17, 1993 [DE] Germany ............... 43 43 198.4

[51] Int. Cl.$^6$ ................ G01B 7/30; G01D 5/14; H03K 5/12; G01P 3/44

[52] U.S. Cl. ............ 324/207.25; 123/414; 324/103 P; 324/166; 324/207.2; 327/62

[58] Field of Search ................ 324/166, 173, 324/174, 207.2, 207.21, 207.25, 103 P; 340/670, 686; 364/565; 123/146.5 A, 414; 327/62

[56] References Cited

U.S. PATENT DOCUMENTS

| 3,819,268 | 6/1974 | Johnson | 324/173 X |
|---|---|---|---|
| 3,832,635 | 8/1974 | Cass | 324/174 X |
| 3,970,935 | 7/1976 | Beery et al. | 324/166 |
| 4,127,812 | 11/1978 | Baliguet | 324/174 |
| 4,213,085 | 7/1980 | Ramer | 324/103 P X |
| 4,293,814 | 10/1981 | Boyer | 324/207.2 X |
| 4,518,918 | 5/1985 | Avery | 324/207.2 |
| 4,629,982 | 12/1986 | Kieslich | 324/207.23 |
| 4,737,710 | 4/1988 | Van Antwerp et al. | 324/207.2 |
| 5,083,282 | 1/1992 | Katayama et al. | 324/103 P X |
| 5,196,794 | 3/1993 | Murata | 324/207.2 X |

FOREIGN PATENT DOCUMENTS

| 2571134 | 4/1986 | France . | |
|---|---|---|---|
| 1237173 | 2/1965 | Germany . | |
| 2114149 | 3/1971 | Germany . | |
| 3220896 | 12/1983 | Germany . | |
| 3904958 | 8/1990 | Germany . | |
| 4209212 | 9/1993 | Germany . | |
| 990993 | 5/1965 | United Kingdom | 324/174 |

*Primary Examiner*—Gerard R. Strecker
*Attorney, Agent, or Firm*—Furgang & Milde, LLP

[57] ABSTRACT

The device proposed comprises a Hall sensor (101) with an associated magnet (102), a pulse-generation wheel (104) rotating at an angular speed w and fitted with teeth having a rising and falling face, the wheel turning in front of the sensor to generate a curve which corresponds exactly to the tooth-face positions and which can be used to determine precisely the position of the rotating shaft. The Hall sensor 9101) registers the variation with time of the magnetic flux density through the pulse-generation wheel (104) as a Hall voltage signal. This signal is converted by a differentiator circuit (103.2) into a differentiated signal. The maxima and minima of the differentiated signal are determined and a digital output signal (AS) is generated form the differentiated signal, the low-level to high-level transitions in the output signal corresponding to the maxima of the differentiated signal and the high-level to low-level transitions corresponding to the minima.

9 Claims, 5 Drawing Sheets

METHOD AND DEVICE FOR DETERMINING THE POSITION OF A ROTATING COGWHEEL

BACKGROUND OF THE INVENTION

The present invention concerns a method of and a device for determining the position of a rotating shaft. A cogwheel rotates in front of a Hall generator and a magnet at a specific angular speed w. The wheel's cogs produce variations in the magnet's flux density B over time. The Hall generator detects the variations and emits a proportional signal B(t). The instantaneous position of the shaft is calculated from the signal.

A method of this genus is known from the German Patent No. 3,220,896. A sensor measures the variations over time t of a magnetic flux density B produced by a segmented wheel of ferromagnetic sheet rotating in front of a Hall generator. Downstream of the Hall generator is a processor with a component that differentiates a signal B(t) and emits a result B'(t). Result B'(t) is employed only to control a gate that in turn controls a counter. The number of pulses is associated with the length of the segments. The differentiated signal accordingly only controls a gate. Cog shape is not precisely correlated with the resulting curve.

Positioning a differentiating circuit comprising two Hall generators in front of a rotating cogwheel with a permanent magnet is known from the German Patent No. 4,209,212. The cogwheel is specifically segmented to produce phase-shifted signals in the generators. At least two cogs must accordingly be scanned to determine the position of the wheel. The wheel must rotate rapidly. Cog shape is not directly associated with the shape of a curve.

The French Patent No. 2,571,134, finally, describes a device with a cogwheel and a Hall generator within the wheel's range. The magnet's flux density B is measured as the wheel rotates. Although the flux is basically sinusoidal, it has an anomaly in the gaps between the cogs. Variations in the anomaly are mathematically processed. There is no precise correlation between the positions of cogs and a signal curve.

SUMMARY OF THE INVENTION

The principal object of the present invention is accordingly a method of, and a device for determining the position of a rotating shaft whereby a curve is generated that precisely represents the position of the edges of cogs and accordingly allows precise determination of the position of the rotating shaft. This object, as well as other objects which will become apparent from the discussion that follows, are achieved, in accordance with the present invention, by providing a wheel that rotates at a specific angular speed w between a Hall generator and a magnet, wherein the wheel is provided with cogs (Z) that have an ascending edge (ZFA) and a descending edge (ZFF) and produce variations in the magnet's flux density (B) over time, wherein the Hall generator detects these variations and emits a proportional signal B(t), and wherein the signal is converted in a differentiator into a differentiated signal (SMP1). According to the invention, the maxima ($SMP1_{max}$) and minima ($SMP1_{min}$) of the differentiated signal are identified and a digital output (AS) is derived from it. The transitions from the low level (ASL) to the high level (ASH) of the digital output represent the maxima and the transitions from the high level to the low level represent the minima of the differentiated signal.

The present invention exploits the awareness that it is the edges of the cogs that produce the widest variation in magnetic flux density per unit of time as the wheel rotates. This parameter is independent of the absolute value of the flux and is accordingly unaffected by temperature or operating distance or by tolerances in the Hall generator.

The method in accordance with the present invention accordingly allows the construction of an analog Hall generator that can obtain highly precise digital signals from practically any type of wheel. The instantaneous position of a cog can be precisely detected and the corresponding position of a camshaft, crankshaft, or similar component can accordingly be determined just as precisely.

A rectangular measurement-point signal can be constructed from the differentiated measurement signal. The rising edge of the rectangular signal will be produced by the initial maximal deflection and the falling edge by the initial negative deflection. A corner-point measurement signal can be obtained from the rectangular measurement-point signal. The peak value of the corner-point measurement signal will coincide with the highest value of the differentiated measurement signal, and its trough value with the deepest point of its lowest value. It accordingly becomes possible to convert an analog measurement signal obtained at high precision into a digital measurement signal.

The device for carrying out the method includes the aforesaid cog wheel, the Hall generator and a differentiator that converts the signal B(t) into a differentiated signal (SMP1). The device further comprises an inflection-point detection circuit downstream of the differentiator that can identify the maxima ($SMP1_{max}$) and minima ($SMP1_{min}$) of the differentiated signal as well as means for producing a digital output (AS) from the differentiated signal.

It is of advantage for the inflection-point detection circuit to comprise an amplifier having an output terminal connected to a first input terminal of a bi-directional driver. A first input terminal of the amplifier is connected to a first input terminal of a first comparator and to a first input terminal of a second comparator. A second input terminal of the amplifier is connected to a capacitor that is connected to ground and a second input terminal of the first comparator. A second input terminal of the bi-directional drive is also connected to the first comparator. A third input terminal of the bi-directional drive is connected to the first input terminal of the second comparator, a second input terminal of which is connected to ground.

It is an advantage for the amplifier to be a differential amplifier. Such a component can convert the differentiated signal into a digital output step by step.

It is an advantage for the bi-directional drive to comprise two interconnected resistors, each at the base of a transistor. There is a series of two diodes between the junction between the first resistor and the base of the first transistor and the junction between the second resistor and the second transistor. The two diodes preferably act as an analog AND gate.

It is an advantage for the differentiator to comprise a second differential amplifier, the first terminal of which is connected to ground and the second input terminal of which is connected to a third resistor that parallels the second resistor and is connected to its output terminal. Another capacitor parallels the third resistor and is connected to the output terminal of the second differential amplifier and to a series circuit comprising a third capacitor and a fourth resistor.

It is also possible to employ other types of differentiator that allow the shape of a pulse to be varied by forwarding it through linear or non-linear components. The differentiator in accordance with the present invention purposely generates pulses with their maxima and minima exactly matching the edges of the cogs.

A Hall amplifier in the form of an integrated circuit ensures direct input of the resulting value for further conversion.

Wheels with cogs in various patterns can be employed. Wheels with conventional configurations are generally employed. They are designed in accordance with the specifications in Motormanagement.

The wheels are conventionally made of high-permeability materials. The associated magnet can on the other hand be a permanent magnet made in particular of samarium and cobalt, barium titanate and ferrite, rare-earth magnetics, etc.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
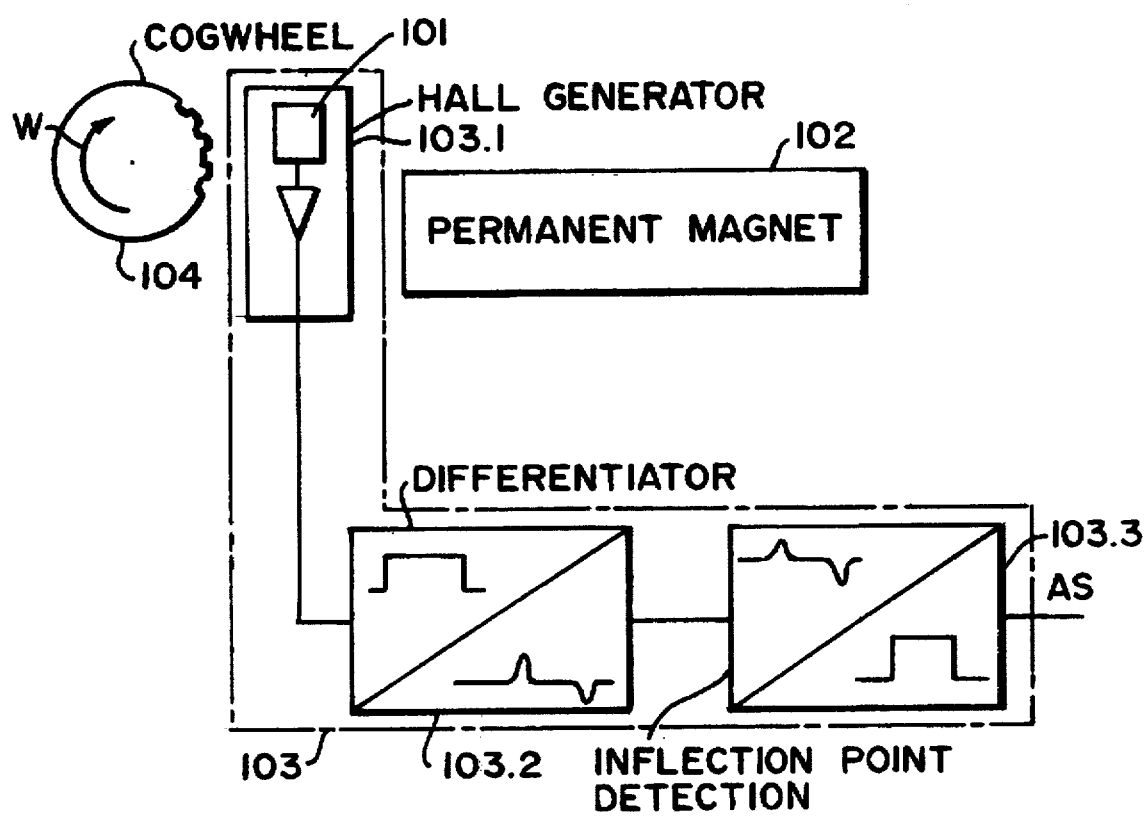
FIG. 1 is a circuit diagram illustrating the principle employed in determining the position of a rotating shaft in accordance with the present invention.

A device for determining the position of a rotating shaft in accordance with the present invention includes a Hall generator 101 of the type illustrated in FIG. 1. It is part of a processing circuit 103 that also includes an integrated complex Hall amplifier 103.1, a differentiator 103.2, and an inflection-point detection circuit 103.3. Positioned in the vicinity of Hall generator 101 is a permanent magnet 102 made of samarium and cobalt, barium titanate and ferrite, rare-earth magnetics, etc. Electromagnets are also possible.

Positioned in front of Hall generator 101 is a wheel 104, various embodiments of which will be specified hereinafter.

Figure 5:
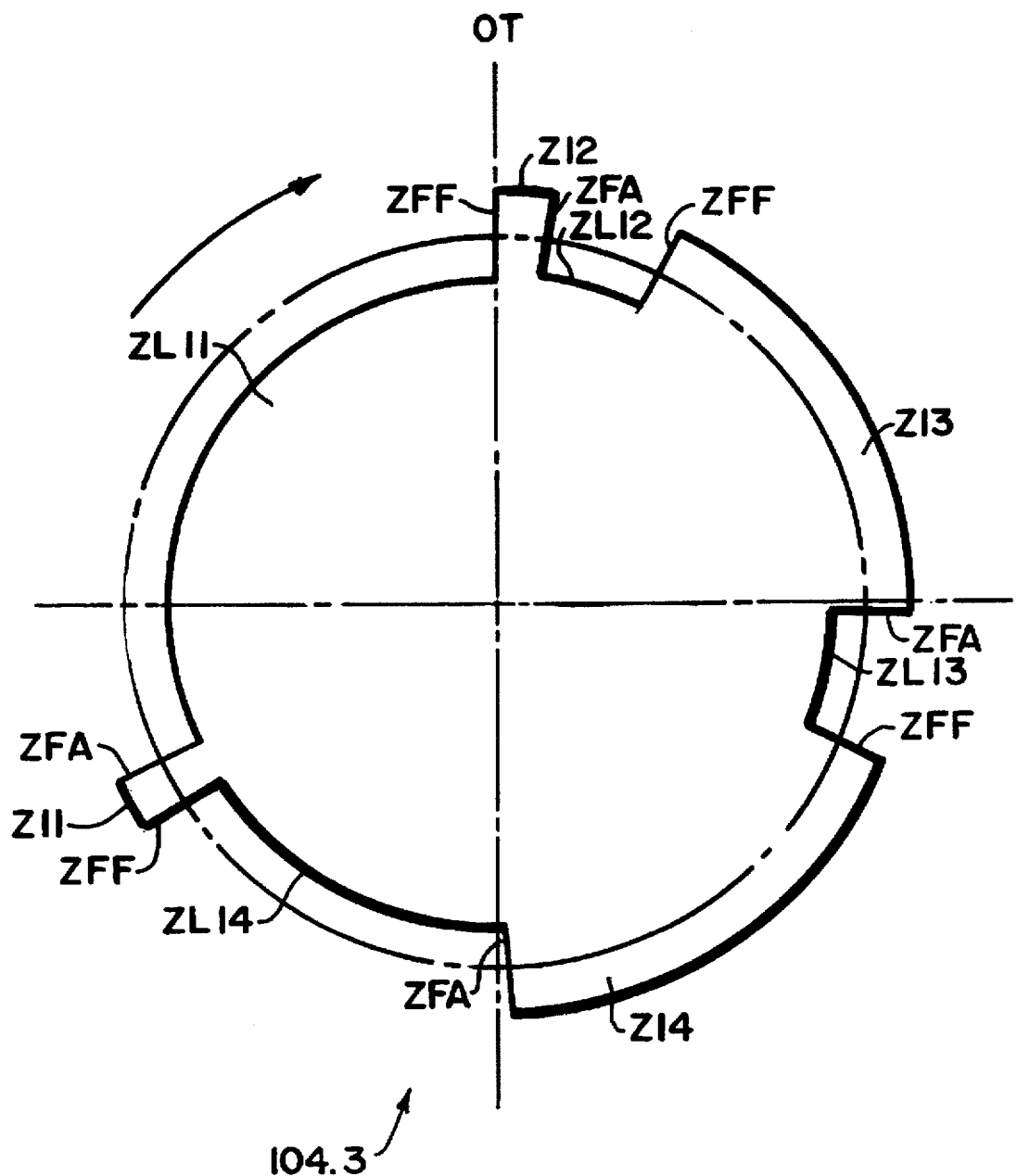
FIG. 5 is a schematic side view of a wheel of a type employed in the device illustrated in FIG. 1.

FIG. 5 illustrates a wheel 104.3 mounted on a camshaft with an upper dead center OT. Wheel 104.3 has cogs Z11, Z12, Z13, and Z14. Cogs Z11 and Z12 are similar, and each extends around 8° of the total 360°. Teeth Z13 and Z14 are also similar, and each extends around 65°.

The distances between the edges of cogs Z11, Z12, Z13 and Z14 will now be specified.

a) The ascending edge ZFA of cog Z11 is 8° from its descending edge ZFF.

b) The descending edge ZFF of cog Z11 is 60° from the ascending edge ZFA of cog Z14.

c) The ascending edge ZFA of cog Z14 is 65° from its descending edge ZFF.

d) The descending edge ZFF of cog Z14 is 20° from the ascending edge ZFA of cog Z13.

e) The ascending edge ZFA of cog Z13 is 65° from its descending edge ZFF.

f) The descending edge ZFF of cog Z13 is 20° from the ascending edge ZFA of cog Z12.

g) The ascending edge ZFA of cog Z12 is 8° from the descending edge ZFF of cog Z12.

h) The descending edge ZFF of cog Z12 is 114° from the ascending edge ZFA of cog Z11.

Figure 6:
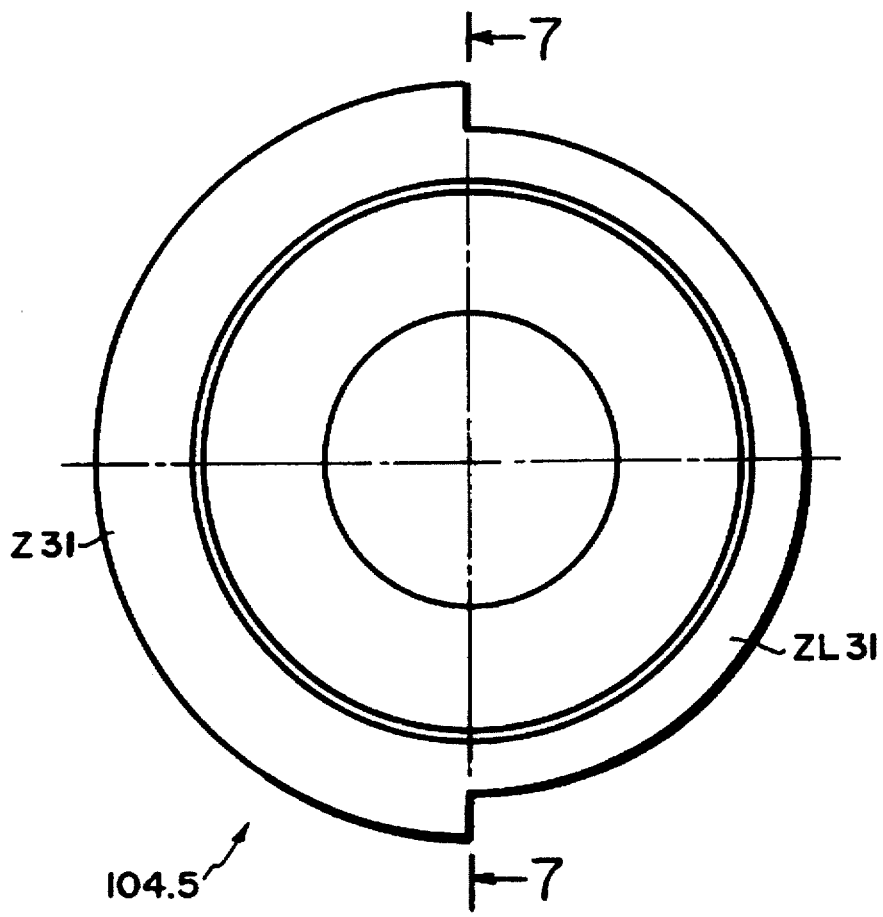
FIG. 6 is another schematic side view of a wheel of a type employed in the device illustrated in FIG. 1.
Figure 7:
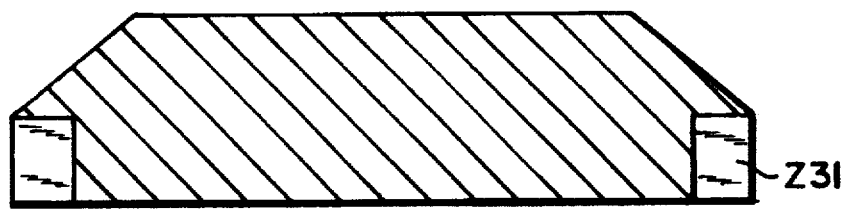
FIG. 7 is a section through the wheel illustrated in FIG. 6 along the line VII—VII.

FIGS. 6 and 7 illustrate a wheel 104.5 with a single cog Z31 and a single gap ZL31. The cog can extend 179° for example. Even such unusual cogs can be employed in accordance with the present invention.

Wheels 104, 104.3, and 104.5 rotate in front of Hall generator 101 and magnet 102 at a specific angular speed w.

Tests of such wheels have demonstrated that the magnetic flux density B varies most rapidly at the edges of the cogs. The first derivative of magnetic flux density B with respect to time, $$B'(t)=dB(t)/dt;$$

accordingly exhibits a definite maximum at ascending edge ZFA and a definite minimum at descending edge ZFF. This phenomenon constitutes the basis of the present invention.

Figure 3:
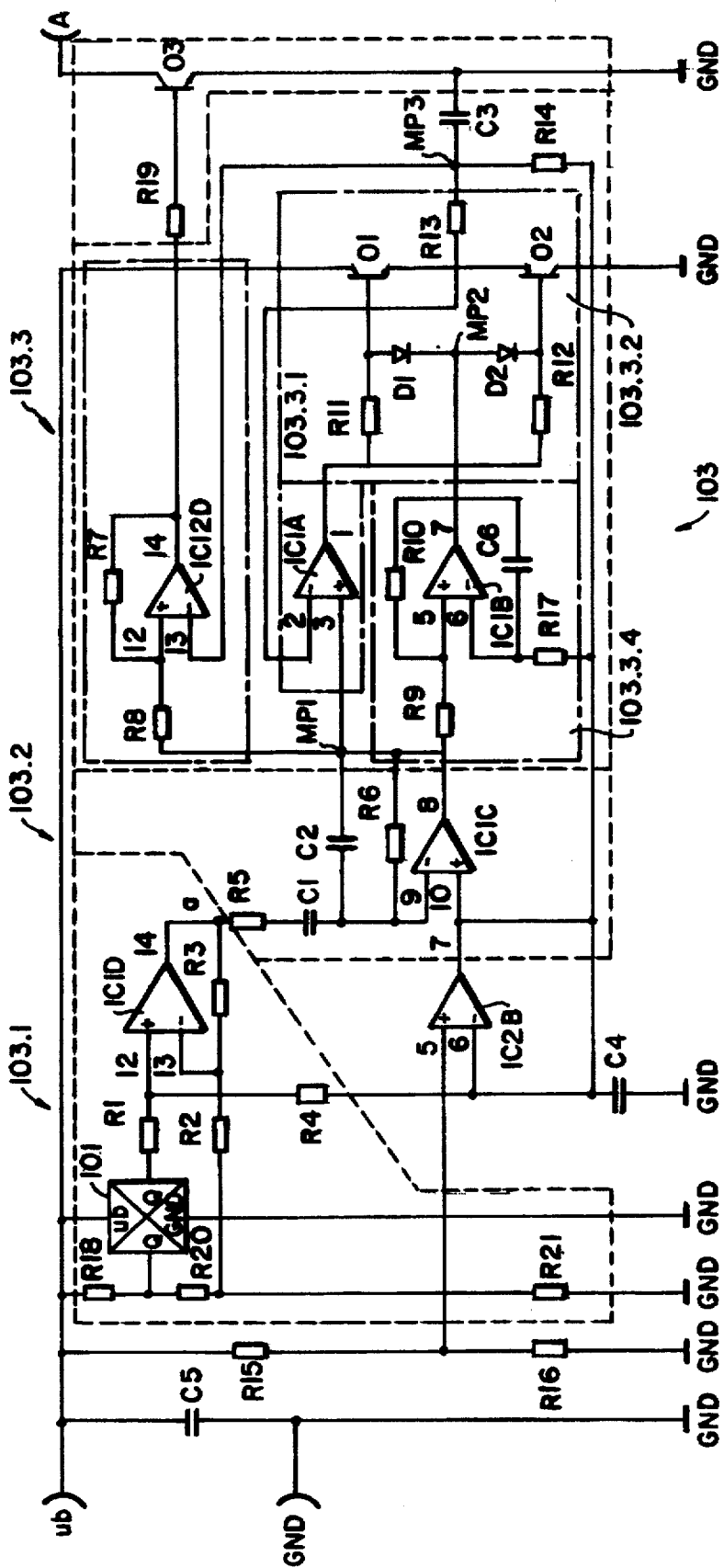
FIG. 3 is a detailed wiring diagram of the device illustrated in FIG. 1.

The Hall generator 101 illustrated in FIG. 3 is embedded in processing circuit 103. One input terminal $U_b$ of Hall generator 101 is connected to operating voltage and the other input terminal GND is to ground. There is another input terminal Q–between resistors R18 and R20. Resistors R18 and R20 are connected in series along with another resistor R21 between operating-voltage input terminal $U_b$ and ground GND. Another resistor is connected to an input terminal Q+.

The core of the processing circuit 103 is constituted by six differential amplifiers IC1A, IC1B, IC1C, IC1D, IC2B, and IC2D along with an AND gate in the form of two diodes D1 and D2 and with a capacitor C3.

Resistors R1 and R4 are connected to the input terminal 12 of differential amplifier IC1D. Resistor R4 is connected to ground GND by way of a capacitor C4. The second input terminal of differential amplifier IC1D is connected between two resistors R2 and R3. Resistor R2 leads to a connection between resistors R20 and R21. Resistor R3 is connected along with another resistor R5 to the output terminal 14 of differential amplifier IC1D. Resistor R5 is connected through a capacitor C1 to the first input terminal 9 of differential amplifier IC1C.

A line extends from capacitor C1 to another capacitor C2 along with another line that accommodates a resistor R6.

The input terminal 5 of differential amplifier IC2B is connected between resistors R15 and R16, which are connected between operating voltage $U_b$ and ground GND. The amplifier's second input terminal is as hereintofore specified connected between resistor R4 and capacitor C4. The amplifier's output terminal is connected to a line that also extends to where resistor R4 is connected to capacitor C4. It is also connected at the output terminal to the second input terminal 10 of differential amplifier IC1C. The output terminal of differential amplifier IC1C is connected to a resistor R9.

Figure 2:
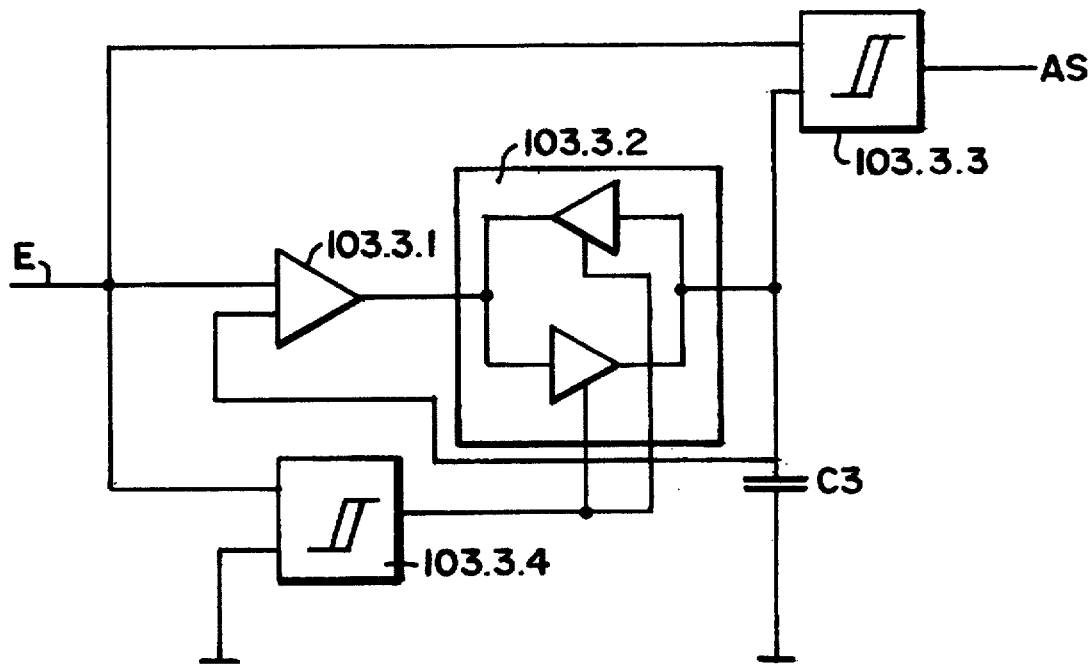
FIG. 2 is a block diagram of an inflection-point detection circuit as in FIG. 1.

One input terminal 3 is connected to a line leading to capacitor C2. At a point MP1 the line intersects another line, which differential amplifier IC1C and resistors R9 and R6 are connected to. Point MP1 of intersection constitutes the input terminal E of inflection-point detection circuit 103.3 (FIG. 2).

Another line extends from capacitor C3 to the other input terminal 2 of differential amplifier IC1A by way of a resistor R13. Resistor R13 connects the terminal MP3 to the input terminal 2 of amplifier IC2IA.

The bases of both transistors 01 and 02 are controlled from the output terminal of differential amplifier IC1A by way of resistors R11 and R12. Interposed between resistor R11 and resistor R12 is the AND gate in the form of diodes D1 and D2. The output terminal of differential amplifier IC1B is connected to the point MP2 of intersection between diodes D1 and D2. The same terminal extends by way of a capacitor C6 to another input terminal 6. Resistor R9 is also connected to first input terminal 5. A further resistor R17 is connected between the input terminal 6 and a connection between capacitor C4 and resistor R14.

The line extending from operating-voltage input terminal $U_b$ is diverted at transistor 01 to transistor 02 and terminates at a ground terminal GND.

Differential amplifier IC2D has a resistor R8 between measurement point MP1 and its input terminal 12. Also between input terminal 12 and output terminal 14 is a resistor R7. Output terminal 14 is also connected by way of resistor R19 and a third transistor 03 to output terminal A, capacitor C3, and ground GND.

The second input terminal 13 of differential amplifier IC2D is connected to a measurement point MP3 between resistor R13 and capacitor C3 and leads to resistor R14.

The following components are represented combined into assemblies by boxes in FIG. 3, which is a more concrete version of FIG. 2.

Differential amplifier IC1A constitutes an amplifier 103.3.1;

diodes D1 and D2, transistors 01 and 02, and resistors R11 and R12 comprise a bi-directional driver 103.3.2;

differential amplifier IC2D, transistor 03, and resistors R7, R8, and R19 comprise a comparator 103.3.3;

differential amplifier IC1B, capacitor C6, and resistors R9, R10, and R17 comprise a comparator 103.3.4;

differential amplifier IC1C, capacitors C1 and C2, and resistors R5 and R6 comprise a differentiator 103.2; and differential amplifier IC1D, Hall generator 101, and resistors R1, R2, R3, R18, R20, and R21 comprise an integrated Hall-amplifier circuit 103.1.

It is also possible to employ slightly different types of amplifier 103.3.1, bi-directional driver 103.3.2, and comparator 103.3.3 or 103.3.4. This is also true mutatis mutandis for other components of the circuit as well.

Figure 4:
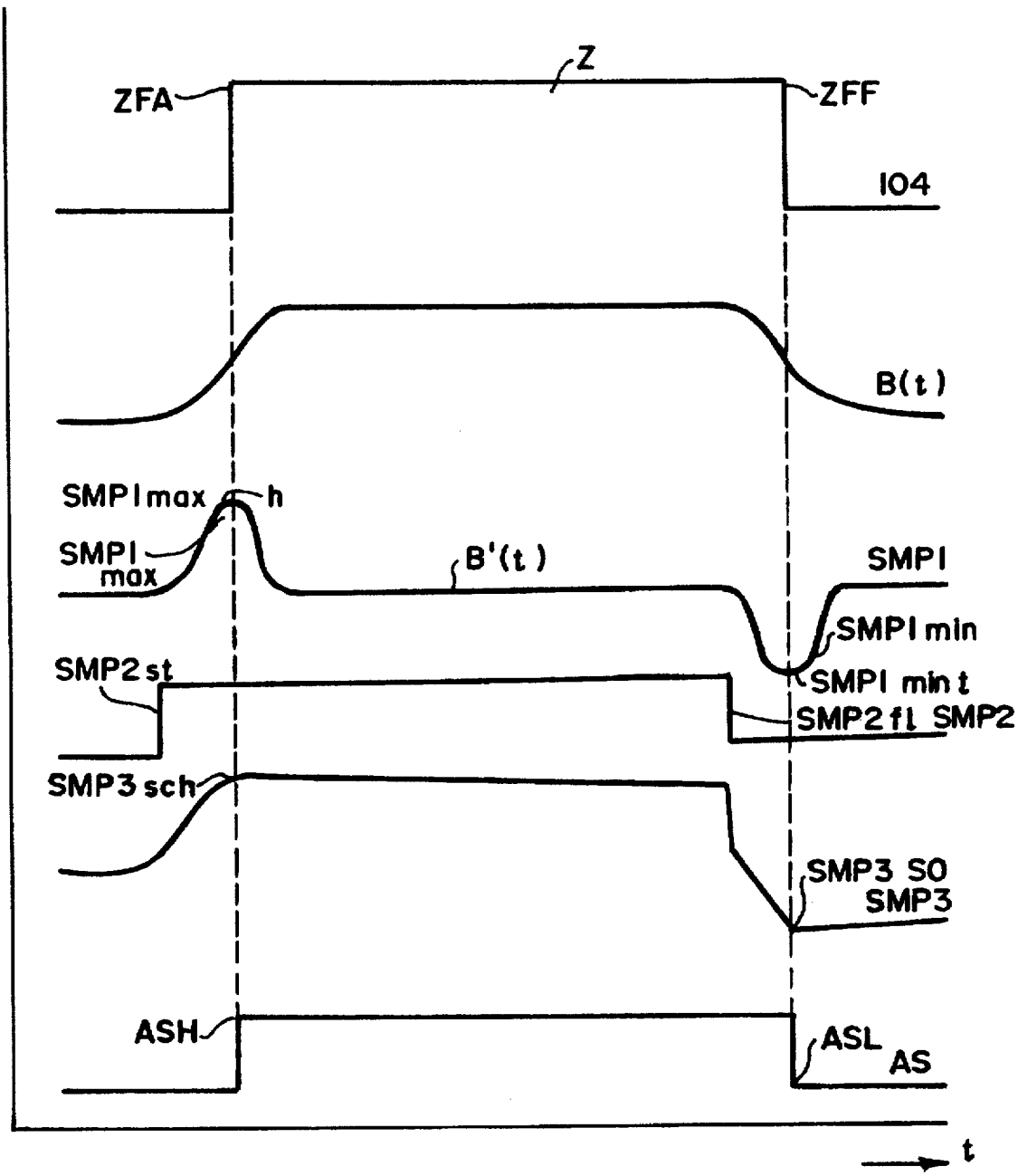
FIG. 4 is a graph of various signals that can occur as a function of time in circuitry of the type illustrated in FIG. 3.

How the device in accordance with the present invention operates will now be specified with reference to the drawing, especially FIGS. 1 and 4.

Wheel 104 rotates in front of Hall generator 101 and magnet 102. As will be evident from FIG. 5, each cog Z has an ascending edge ZFA and a descending edge ZFF. Hall generator 101 detects variations in the magnet's flux density B. The signal B(t) emitted by the Hall generator is characterized by an ascending edge (on the left) and a descending edge (on the right). The signal is amplified in integrated Hall-amplifier circuit 103.1 and supplied to differentiator 103.2.

Differential amplifier IC1C converts signal B(t) into a differentiated measurement signal B'(t)=SMP1. Signal SMP1 is characterized by deflections SMP1max and SMP1min. The highest point of the maximal deflection is SMP1maxh and its minimal point is SMP1mint.

The accordingly converted differentiated signal SMP1 is available at the input terminal E of inflection-point detection circuit 103.3 at measurement point MP1 (FIGS. 2 & 3). The maximum, SMP1max, of differentiated signal SMP1 causes differential amplifiers IC1A, IC1B, and IC1D to generate a rectangular measurement-point signal SMP2 at measurement point MP2. The ascending edge SMP2st of rectangular measurement-point signal SMP2 coincides with the initial ascent of differentiated measurement signal SMP1. Capacitor C3 is simultaneously charged to the maximum at measurement point MP3.

A descending edge SMB2Fl is generated for rectangular measurement-point signal SMP2 simultaneously with the commencement of the minimal deflection of differentiated signal SMP1. This event leads to the discharge of capacitor C3. The resulting corner-point measurement signal SMP3 is characterized by a peak value SMP3sch and a trough value of SMP3so.

A digital output AS is generated at output terminal A by differential amplifier IC2D in particular simultaneously with the attainment of peak value SMP3sch. Signal AS has a high level at this point and attains its low level SMP3so upon attaining its trough value.

As will be evident from FIG. 4, digital output AS imitates the shape of cog Z. When a wheel 104.3 of the type illustrated in FIG. 5 is employed for example, cog Z11 results in a brief high level ASH and cog Z13 a high level of longer duration. The gaps are similarly copied in the form of low levels ASL.

The sequence of high and low levels make it possible to precisely determine the position of all cogs Z11 through Z14 and accordingly the position of the shaft.

Since the absolute height of the Hall signal is not important, jolting, aging, etc. will have little effect.

There has thus been shown and described a novel method and device for determining the position of rotating shafts which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a device for determining the position of a rotating shaft, said device comprising a wheel, connected to said shaft, that rotates at an angular speed w in front of a Hall generator and a magnet, wherein the wheel is provided with cogs (Z) that have an ascending edge (ZFA) and a descending edge (ZFF) and produce variations in the magnet's flux density B over time, wherein the Hall generator detects the variations and emits a proportional signal B(t), said device further comprising a differentiator that converts the signal B(t) into a differentiated signal (SMP1), the improvement comprising an inflection-point detection circuit coupled to the differentiator for identifying the maxima ($SMP1_{max}$) and minima ($SMP1_{min}$) of the differentiated signal, said detection circuit producing a digital output signal (AS) in which the transitions from the low level (ASL) to the high level (ASH) of the digital output signal represent the maxima and the transitions from the high level to the low level represent the minima of the differentiated signal, thereby indicating the positions of the ascending edges (ZFA) and descending edges (ZFF) of the cogs, and wherein the said detection circuit comprises a differential amplifier to which the differentiated signal is input to a first input terminal thereof and wherein the output terminal of the said amplifier is connected to a first terminal of a bi-directional driver, a first input terminal of the said amplifier is connected to a first input terminal of a first comparator and to a first input terminal of a second comparator, and a second input terminal of the said amplifier is connected to a ground-referenced capacitor and a second input terminal of the first comparator, to which a second terminal of the bi-directional driver is also connected, and a third terminal of the bi-directional driver is connected to the output terminal of the second comparator, a second input terminal of which is ground-referenced.

2. The device defined in claim 1, wherein the bi-directional driver comprises two, interconnected first and second resistors, each of which is connected to the base of a first and second transistor and by an AND gate in the form of a series of two diodes between the connection between the first resistor and the base of the first transistor and the connection between the second resistor and the base of the second transistor.

3. The device defined in claim 2, wherein the differentiator comprises a second differential amplifier, the first input terminal of which is connected to ground and the second input terminal of which is connected to a third resistor that parallels the second resistor and is connected to its output terminal, another capacitor that parallels the third resistor and is connected to the output terminal of the second differential amplifier, and to a series circuit comprising a third capacitor, a fourth resistor and said Hall generator.

4. A Hall effect sensor processing circuit, for determining an angular position of a rotating body having a magnetically permeable cogged wheel, having ascending edges and descending edges, rotating within a magnetic field in proximity to a Hall effect sensor, the relative movement of the cogged wheel with respect to the magnetic field producing variations in magnetic flux at the Hall effect sensor over time, said processing circuit receiving a differentiated output corresponding to an output of the Hall effect sensor, comprising:

a reference potential;

an integrator, having an integration node at a potential with respect to said reference potential;

a differential amplifier, receiving as a first input said differentiated output and as a second input a signal from said integration node corresponding to said potential, and producing a differential amplifier output;

a first comparator, comparing said differentiated output and said potential and producing a first comparator output;

a second comparator, comparing said differentiated output with said reference potential and producing a second comparator output;

a charging circuit for said integrator, connected to the outputs of said differential amplifier and said second comparator, changing said potential of said integrator with respect to said reference potential, said changing being dependent on the conjunction of said differential amplifier output and said second comparator output, wherein said processing circuit detects maxima and minima of the differentiated signal corresponding to an output of the Hall effect sensor and produces a digital output signal which transitions on the occurrence of a maxima or minima of the differentiated signal, indicating the positions of the ascending edges and descending edges.

5. The circuit according to claim 4 wherein said integrator is a capacitor.

6. The circuit according to claim 4 wherein said charging circuit comprises a bi-directional driver, having as signal inputs said integration node and said differential amplifier output, controlled by said second comparator output.

7. The circuit according to claim 4, wherein said first comparator operates with hysteresis.

8. The circuit according to claim 4, wherein said second comparator operates with hysteresis.

9. The circuit according to claim 4, wherein said second comparator has capacitive negative feedback.

* * * * *